United States Patent
Mueller et al.

[11] 4,311,542
[45] Jan. 19, 1982

[54] METHOD FOR MANUFACTURING A STRIP-SHAPED COMPOSITE BODY

[75] Inventors: Jean-Pierre Mueller, Hauterive; Marius Raemy, Schmitten, both of Switzerland

[73] Assignee: Breveteam S.A., Fribourg, Switzerland

[21] Appl. No.: 118,093

[22] Filed: Feb. 4, 1980

[30] Foreign Application Priority Data

Feb. 7, 1979 [CH] Switzerland .......................... 1195/79

[51] Int. Cl.³ .............................................. B32B 31/26
[52] U.S. Cl. ..................................... 156/84; 156/322; 156/324; 264/230; 264/342 RE; 428/201
[58] Field of Search ............... 156/84, 85, 200, 201, 156/229, 290, 494, 495, 496, 322, 324; 264/230, 342 R, 342 RE; 428/136, 195, 198, 200, 201, 209, 347

[56] References Cited

U.S. PATENT DOCUMENTS

| | | | |
|---|---|---|---|
| 3,616,152 | 10/1971 | Chandler | 156/84 |
| 3,632,733 | 1/1972 | Yazawa | 264/342 R |
| 3,769,120 | 10/1973 | Chandler | 156/84 |
| 3,885,074 | 5/1975 | Chandler | 156/84 |

*Primary Examiner*—Caleb Weston
*Attorney, Agent, or Firm*—Kenyon & Kenyon

[57] ABSTRACT

The perforated web and a carrier web are passed through a heated zone while moving through a curved path in which the perforated web is tensioned. Upon heating of the perforated web, the thermoplastic material of the web shrinks so that a net structure with opened perforations is formed. Inward shrinking of the peripheral zones of the perforated web is prevented by the tensioning of the perforated web in the curved path.

22 Claims, 6 Drawing Figures

METHOD FOR MANUFACTURING A STRIP-SHAPED COMPOSITE BODY

This invention relates to a method and apparatus for manufacturing a web-shaped composite body and to a composite body made thereby.

Heretofore, it has been known to manufacture a web-shaped composite body or non-woven fabric which is composed of a web of material bonded together with a net structure. For example, as described in Swiss Pat. No. 515,109 and U.S. Pat. Nos. 3,616,152, 3,769,120 and 3,885,074, it has been known to form a composite body, i.e. a non-woven fabric, made up of three layers of material by adhesively bonding together two webs of material by means of a net structure, that is, without using a liquid or pasty adhesive. In this respect, the net structure is generally formed from a web having perforations and which is made of a shrinkable, at least monoaxially oriented thermoplastic material which, upon heating, is able to shrink such that a net structure is formed as the perforations open up. However, it has been found that the composite bodies made in the above fashion have a marked inward shrinking of the peripheral zones of the perforated web. For example, with a working width of the webs of material of 50 centimeters, a transverse shrinkage of the perforated webs of, for example 6–8 centimeters, has been observed.

This leads to bunching up of the material at the edges of the net structure, causing a noticable thickening of the edges, amounting to 0.01 to 1.5 millimeters. The webs of material are, accordingly, as viewed over their working width, more strongly bonded together at the edge zones than in the middle zone. In many cases, this results in an inadequate adhesion of the webs of material in the regions between the edges. Further, the presence of the poorly adhering regions results, for example, in the formation of folds in the webs of material so that the composite body not only has an unsatisfactory appearance and insufficient quality but also has insufficient strength. For example, in the event the peripheral zones become torn, the insufficient adhesion or bonding of the webs of material can become disturbingly noticeable.

A further drawback of the marked or strong shrinkage of the edges of the perforated web consists in the formation of more or less outwardly projecting edge strips of the webs of material which lack adhesion as a consequence of the net structure. Thus, the non-adhered peripheral zones must be separated or removed. This, however, not only represents a loss of material but also requires a greater width of the webs of material, corresponding to the edge zones that are cut off, than is necessary for the composite body.

Moreover, in the known methods, folds arise, for example, during manufacture, transverse to the direction of travel of the perforated web, especially when one or both of the material webs tend to shrink i.e. because the material webs are unstable at the softening or plastifying temperature of the perforated web. As a consequence of the peripheral shrinkage caused by the perforated web, the material webs cannot be processed to produce composite bodies in the desired manner with the known methods without damage and, in particular, without the above-mentioned problems and unwanted side effects.

Accordingly, it is an object of the invention to uniformly bond at least one web of material to a net structure over the entire working width of the web.

It is another object of the invention to be able to bond any kind of perforated web and/or webs together to form non-woven fabrics.

It is another object of the invention to avoid transverse shrinkage of a net structure in forming web-shaped composite bodies.

Briefly, the invention provides a method and apparatus of making a non-woven fabric as well as a non-woven fabric made thereby.

In accordance with the method, a perforated web of an at least mono-axially oriented heat-shrinkable thermoplastic material is guided through a heating zone along a guide path which is continuously curved in one direction and heated in the heating zone to a thermoplastic condition in order to shrink the material and form a net structure with opened perforations. In addition, at least one web of material is brought into contact with the heated net structure as a carrier web. This web of material is substantially stable at the plastifying temperature of the perforated web. Thereafter, the contacting web of material and net structure are fed to a pressure zone with the net structure still in a thermoplastic condition and the net structure is bonded to the web of material in the pressure zone while employing the heat of the net structure therefore.

By using a curved guiding path, an auxiliary clamping effect takes place in the heating zone by which the edges of the perforated web transverse to the direction of shrinkage are retained in their predetermined positions. Inward shrinking in the peripheral zones, e.g. as a consequence of sliding on the carrier web in a direction transverse to the direction of travel of the perforated web, is thereby substantially reduced, if not altogether prevented. Thus, the net structure which is formed is present with substantially the same extent, i.e. width, as that of the perforated web which is fed in.

The method makes it possible to have the net structure which is formed extend, directly after being adhesively bonded on at least one side to a web of material, substantially to the edges of the web of material in the web-shaped composite body, i.e. the non-woven fabric. On account of the lack of the bunching up of material at the peripheral zones, because of the prevention of inward shrinkage of the material, the net structure is bonded to the web of material over its entire width to substantially the same degree.

The web-shaped composite body which is formed is comprised of at least one web of material having a pair of longitudinally disposed edges and a net structure of shrunk thermoplastic material bonded to the web and extending from one edge to the other edge of the web. The composite or non-woven fabric can be described as a web-shaped flat entity with a uniformly strong adhesion over the whole working width of the web of material, right up to the edges. The danger of folds being formed is substantially reduced if not indeed entirely overcome. Also, the need for removal of a significant portion of unadhered material of the webs of material at the edges is eliminated. On the contrary, the web of material fed in can have the same width as the perforated web and, accordingly, have the desired width of the composite body to be produced.

The expression "net structure", as used herein, is to be understood in the following as any structure which does not have a complete or continuous surface, which occurs through at least some kind of opening or widening of perforations and, for example, can be a net itself, and which can be directly adhesively bonded to a web of material not over a completely continuous surface.

As a consequence of the curved guide path the perforated web can be fed through the heating zone under tension so that a condition of biaxial stretching can be achieved. This results, for example, in a clinging of the edge regions of the perforated web on shrinkage due to friction, for example on the carrier web. Accordingly, in an advantageous manner, the net structure can be of full and undisturbed form in the regions directly adjacent to the unperforated edge zones, because the edge zones are held in their pre-determined positions by the curvature of the guide path and cannot move inwards. Thus, a non-full or not fully coated face (or dot-by-dot) bonding or welding of the web of material to the net structure by heat sealing, achieved as a consequence of the net structure and as known, according to the invention can occur uniformly over the whole surface of the net structure. On account of the auxiliary clamping, another web of material can be supplied to and deposited on the still free face of the perforated web after the thermo-plastic condition is achieved, so that the heating of the perforated web to the thermo-plastic condition, e.g. by the other web of material, is not adversely affected and can be fully effective on the still uncoated face of the perforated web. In this way, overheating and consequent damage of the net structure and carrier web by heat is avoided. The material of the carrier web, which is substantially stable at the plastifying temperature of the perforated web and shows little shrinkage, allows the perforated web to be guided through the heating zone together with the carrier web. The presence of the bowed or curved guide path prevents the occurrence of unwanted longitudinal folds in the carrier web.

In one embodiment, the perforated web is guided through the heating zone on a curved path with constant or invariable curvature so that a constant tension of the perforated web can be achieved. With reference to the tangent to the apex of the guide path, the perforated web can be fed through the heating zone, in a direction towards the tangent or away from it, and preferably at an angle with respect to the tangent, the magnitude of which is directed for example according to the required degree of curvature for producing the auxiliary clamping. The size of the angle, for example at least 2°, can be advantageous, according to the material used, in order to prevent the occurrence of longitudinal folds in the perforated web and also in the carrier web. The guide path can have one or a plurality of curvatures, e.g. with the same or different angles of curvature. If the perforated web is fed into the heating zone in a direction towards the tangent and is withdrawn from the heating zone in a direction away from the tangent, the perforated web can be fed with a tension which increases in the heating zone up to a maximum and then falls or decreases again. Also, the perforated web can be guided up to a minimum distance from a heating element and led away again. According to the material used for the perforated web and/or the carrier web, the tension and/or also the heating of the perforated web can be influenced or controlled in this way.

The perforated web, which can also be described as a perforated layer, can comprise or contain a plastics material, such as for example polyethylene (PE), ethylene vinyl acetate (EVA) or EVA copolymer, polypropylene (PP), polyamide (PA) polyurethane (PU), polyester (PEST) or another suitable thermoplastic material which can be bonded to the web of material in the thermoplastic condition i.e. at the softening or plastifying by heat sealing temperature. The web can be used in the form of a film or foil or plate. The perforated web can, however, also be a perforated non-woven fabric e.g. a fiber web or the like, which can contain shrinkable fibers, as described for example in Swiss Pat. No. 515 109. The perforated web can have holes punched therein e.g. round holes. Preferably, a slit film is used as a bonding film, for example, comprising a plastics foil with mutually offset slits in substantially parallel rows and arranged substantially transverse to the direction of shrinkage (corresponding to the direction of stretching) of the plastics foil. This embodiment has the advantage that the slit film cannot shrink inwards in the direction of shrinking over unslit bridges but the shrinkage is taken up substantially entirely by opening of the slits. Accordingly, from the slit film with mutually offset slits, a net having a high degree of uniformity of structure can be produced in a particularly advantageous manner. This uniformity is important for uniform adhesion to the carrier web. However, the slits could also be arranged in another manner, as already known from the Swiss Pat. No. 515 109. By using the slit film, the net structure can be formed with intersection points and net webs of small dimensions. This can be advantageous for complete adhesion.

The carrier web and/or the other web of material can comprise a foil e.g. of a plastics material, a woven fabric, a knitted fabric, a non-woven fabric, a layer of threads or the like. The carrier web can also be bonded together, two webs one to the other, a woven fabric or non-woven fabric, e.g. with a foam material or a foil or two foils. Composite bodies of any desired kind can be obtained by means of a net structure, employing the adhesively bonding as described already for example in Swiss Pat. No. 515 109. Mats, floor coverings, decorative materials, clothing fabrics, uppers for shoes, furnishing materials, insulating materials or the like can be produced, equipped on one side or on both sides with a fabric or textile.

According to the material employed, the perforated web is delivered to the carrier web in the pressure zone immediately following the heating zone, or, after leaving the heating zone and before reaching the pressure zone, can be conducted through an unheated zone which is of minimum length so as to maintain the perforated web in a thermoplastic condition.

The method according to the invention is preferably carried out with continuous feeding of the carrier web and the perforated web and for example, the web of another material.

The apparatus for making a non-woven fabric is comprised of a means for supplying a perforated web of an at least mono-axially oriented heat-shrinkable thermoplastic material, a means for supplying a web of material which is stable at the plastifying temperature of the perforated web, a heating zone and means downstream of the heating zone defining a pressure zone. The heating zone has means therein defining a continuously curved guide path for at least the perforated web and means for heating the perforated web in the guide path in order to heat shrink the perforated web into an open net structure.

The means defining the pressure zone serves to bond the heat plastified net structure and web of material together into a non-woven fabric.

In one embodiment, the means defining the curved guide path is in the form of a plurality of grid bars while the means for heating the perforated web is in the form of a heating device disposed in facing relation to the grid bars.

In another embodiment, the means defining the curved guide path is in the form of a drum. In addition, the drum is heated so as to serve as a means for heating the perforated web on the surface thereof.

These and other objects and advantages of the invention will become more apparent from the following detailed description and appended claims taken in conjunction with the accompanying drawings in which:

Figure 3:
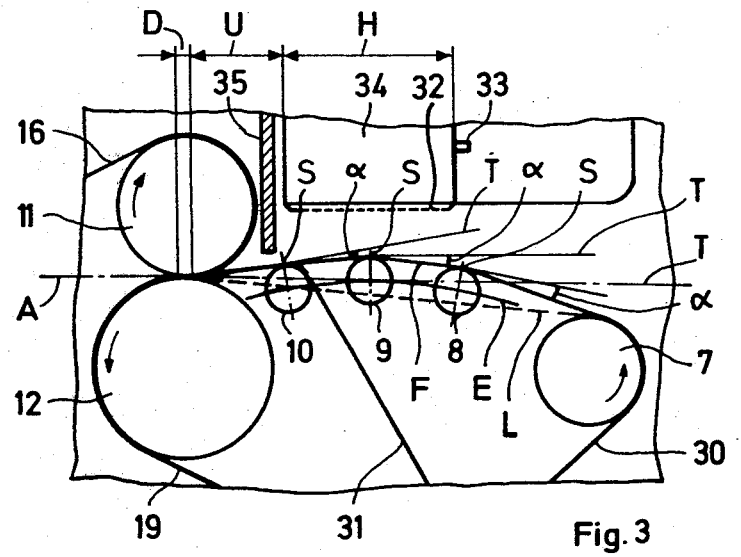
Figure 4:
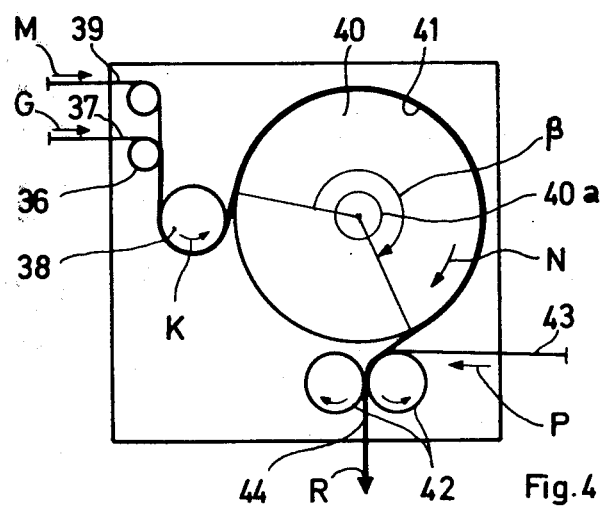
Figure 5:
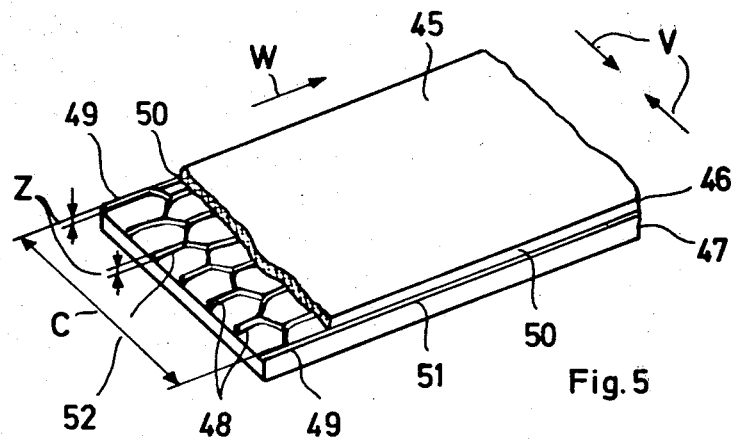
Figure 6:
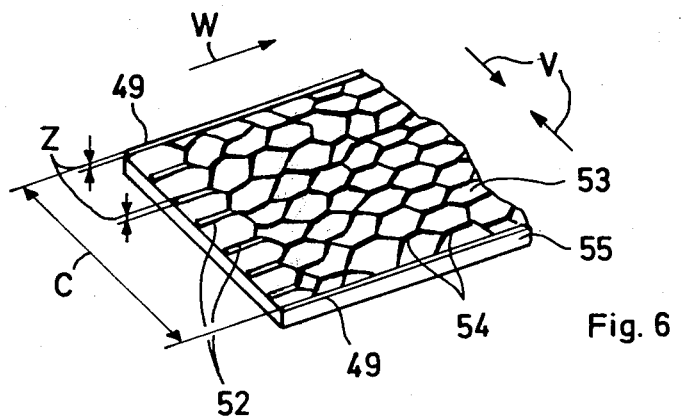

FIG. 3 diagrammatically illustrates a section of another embodiment of part of an apparatus according to the invention;

FIG. 4 diagrammatically illustrates a section of another apparatus for manufacturing a web-shaped composite body in accordance with the invention;

FIG. 5 illustrates a perspective view of part of a web-shaped composite body according to the invention directly after adhesion; and FIG. 6 illustrates a perspective view of part of another web-shaped composite body according to the invention directly after adhesion.

Figure 1:
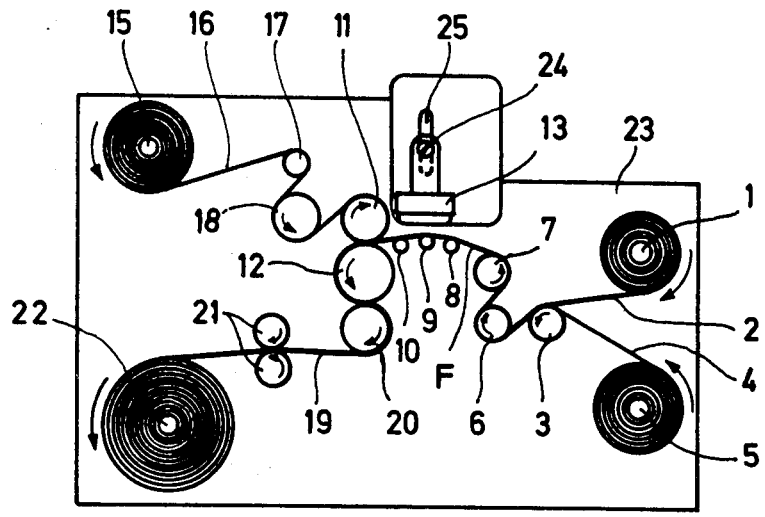
FIG. 1 illustrates a diagrammatic section showing an apparatus for manufacturing a web-shaped composite body in accordance with the invention.
Figure 2:
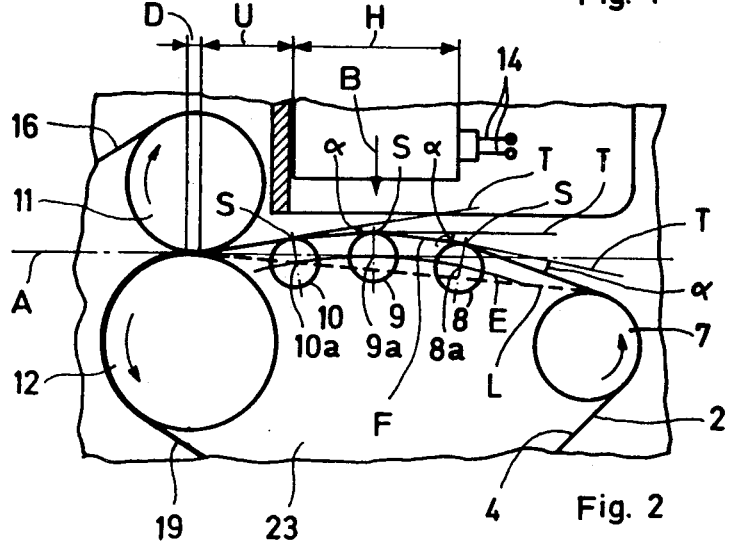
FIG. 2 illustrates a part of the apparatus of FIG. 1 to a larger scale.

Referring to FIG. 1, the apparatus for making a nonwoven fabric includes a means, such as a reel 1, for supplying a perforated web 2 of shrinkable, at least mono-axially orientated, thermoplastic material e.g. a slit film such as described in Swiss Pat. No. 515 109, to a cylinder or roller 3 as well as a means, such as a reel 5 for supplying a carrier web 4 to the roller 3. The perforated web 2 and the carrier web 4 pass together over a guiding and feeding roller 6 and a delivery roller or cylinder 7 which can be driven (by means not shown) and, as shown in FIG. 2, are drawn over a means defining a curved guide path F, such as a grid of bars 8, 9, 10 into a nip plane A by a pair of pressure rolls 11, 12. The pressure rolls 11, 12 serve as a means to define a pressure zone characterized by a length D lying in the nip plane A. Instead of the grid bars 8, 9, 10, freely rotatable or rotatably driven rollers (not shown) could be used.

The apparatus also has a heating means 13 facing the side of the grid bars 8, 9, 10, covered by the slit film 2 and the carrier web 4. The heating means 13 is in the form of an electrically operated heating device 13 having electrical terminals 14 to radiate heat in the direction indicated by the arrow B.

A second reel 15 for supplying another web of material 16 is also provided along with guiding and delivery rollers 17 and 18. This web 16 is passed under the pressure roller 11, likewise to the nip plane A.

The perforated web 2 which is on the side of the carrier web 4 towards the heating device 13, is heated by the device 13 to its thermo-plastic condition over a heating zone characterized by a length H, so that the web 2 shrinks and the slits open, resulting in a net structure. After the net structure has left the heating zone H, the web 16 of material is applied on the still uncoated i.e. free surface of the net and the net is caused to be bonded and heat sealed in the pressure zone D, on the one hand, to the carrier web 4 and, on the other hand, to the web 16 of material, i.e. on both faces, making use of the heat retained therein from the shrinkage step. The carrier web 4 and the web 16 of material are accordingly bonded together in the pressure zone D by means of the net structure to form a composite body or nonwoven body 19 which, after leaving the pressure zone D is withdrawn over a guide roller or cylinder 20 through a draw-off pair of rollers 21 and is finally wound up on a reel 22.

As shown in FIG. 2, the grid bars 8, 9, 10 are arranged with their longitudinal axes 8a, 9a, 10a on an arc E of a circle, so as to circumscribe the corners of a convex regular polygon (not shown) in which the axes 8a, 9a, 10a are situated. The guide path F is, thus, continuously curved in one direction, while being convexly curved with respect to the heating device 13 so that the slit film 2 is heated on the convexly curved side of the guide path F. The slit film 2 guided through the heating zone H onto each bar 8, 9, 10 with uniform curvature and at an angle $\alpha$ of at least 2° with respect to the tangent T drawn at the highest point of vertex S of the guide path F. By virtue of the curvature of the guide path F, there is a diversion of the slit film 2 and also of the carrier web 4 with respect to a straight-line path L, illustrated by a dotted line which extends directly from the delivery roller 7 to the nip plane A and thereby into the pressure zone D. Thus, an auxiliary clamping is achieved with the slit film 2 and the carrier web 4 under tension on the guide path F and thereby in the heating zone H.

As shown in FIG. 2, the slit film 2 is led into the heating zone H in a direction towards the tangent T on the grid bars 8 and 9 and is withdrawn from the heating zone H in a direction away from the tangent T on the grid bars 9 and 10, so that the tension at the vertex S over the grid bar 9 is at a maximum. If each angle $\alpha$ at the grid bars 8 and 9 amounts to 3°, a total angle of curvature of 6° exists from the inlet side of the slit film 2 to the highest vertex point S at the grid bar 9. The same angle results correspondingly at the delivery side from the grid bar 9 in a direction towards the pressure zone D. As a result of the tension, the slit film 2 adheres to the carrier web 4 so that the edges of the film 2 are prevented from shifting by shrinkage transverse to the direction of travel.

The components of the apparatus described so far are arranged in a frame 23, the guiding and delivery rollers 3, 6, 7, 17, 18 and 20 and the reels 1, 5, 15 and 22 being capable of rotating or being driven in the directions indicated by the arrows. In the same way, the pairs of rollers 11, 22 and 21 are mounted in the frame 23 to be driven in the direction of the arrows indicated.

To set a desired spacing in relation to the bars 8, 9, 10 and thereby to the slit film 2 on the curved guide path F, the heating device 13 is mounted to slide by means of a securing screw 24 working in a slot-shaped guide 24 in the frame 23 in a direction towards the bars 8, 9, 10, and is mounted to pivot about the screw 24 as a pivot point.

Instead of arranging the grid bars 8, 9, 10 on an arc E, the bars could also be arranged at the corners of an irregular polygon, so that a curvature of the guide path can be achieved corresponding to requirements. Similarly, the highest vertex of the curvature can be at another point in the heating zone H. During operation, while maintaining the tension until bonding in the pressure zone D, the slit film 2 together with the carrier web 4 passes between the heating zone H and the pressure zone D through the unheated zone U.

Referring to FIG. 2, an unheated zone U may be disposed between the heating zone H and the pressure zone D which is of a length depending, for example, on the kind of material and the delivery speed of the slit film 2 as well as the intensity of heating depends on the maintenance of the thermoplastic condition of the material of the slit film 2 until the film 2 reaches the pressure zone D and, for example, can be less than 50 centimeters, e.g. 25 to 30 cm.

According to the kind of material and/or for example a thickness of the carrier web 4, the guide roller 6, the feed roller 7, the grid bars 8, 9 and 10, the pressure rollers 11, 12, the feed roller 18 and/or guide roller 20 can be kept at a desired temperature, by heating or cooling, so that the thermoplastic condition of the slit film 2 can be achieved without damage to the carrier web 4 and/or the web 16 of material. Thus, a desired bonding is achieved to form the composite body 19. In this way, the thermoplastic condition can be maintained in a desired manner until bonding in the pressure zone D and overheating of the slit film 2, the carrier web 4, the web 16 of material and/or the above-mentioned rollers and bars can be avoided. It is also possible to envisage, in place of the bars 8, 9, 10, the provisions of a corresponding curved plate which can be provided with perforations or cooled or heated.

Using a slit film 2 made, for example, of EVA copolymer having a width of, for example, 160 cm and a thickness, for example, 50 to 200 microns, the process is performed with a heating temperature of, for example, 150° to 200° C. at the surface of the slit film 2 and a travel velocity of for example 6 meters per minute.

Referring to FIG. 3, wherein like reference characters indicate like parts as above, a perforated web 30 is guided on the curved path F through the heating zone H and a carrier web 31 is fed in on that side of the perforated web 30 which is towards the bars 8, 9, 10, i.e. on the underside of the web 30 at the bar 10, at which point the perforated web 30 is in a thermoplastic condition. The web 30 can have any kind of perforations that shrink on heating to form a net structure and, for example, can be a slit film as described in connection with FIGS. 1 and 2. The perforated web 30 is heated in the heating zone H by a gas-fired infra-red heater 32 of a heating device 34. To protect the pressure rollers 11, and thereby the web 16, from overheating, a cooling device 35 is mounted on the frame 23 in the unheated zone H and shields the rollers 11 from heat radiated by the heating device 34.

The manufacture of the composite body 19 takes place as described in the embodiment of FIGS. 1 and 2.

As shown in FIG. 4, a carrier web 37 delivered in the direction of the arrow G over a guide roller 36 is brought together with a perforated web 39 on a delivery roller 38 driven in the direction indicated by the arrow K. The web 39 is fed in along the direction indicated by the arrow M and is disposed, after combination, on that face of the carrier web 37 which is towards the delivery roller 38. From the feed roller 38, the carrier web 37 and the perforated web 39 are transferred together to a heated drum 40 which is driven in the direction indicated by the arrow N (by means not shown), on which drum 40 the carrier web 37 lies as an inner layer, with the perforated web 39 forming an outer layer. In passing around the drum 40 through an angle β the perforated web 39 together with the carrier web 37 are guided through the heating zone along a curved guide path formed by the surface 41 of the drum 40 and curved constantly in one direction. The length of the path is defined by the size of the angle β.

The perforated web 39 is heated on the drum 40 to a thermoplastic condition from the concave side of the guide path 41 through the carrier web 37, so that a net structure is formed with opening up of the perforations as a consequence of shrinkage of the material of the perforated web 39. The net structure, which is in a thermoplastic condition, is drawn off together with the carrier web 37 by a pair of pressure rollers 42 arranged directly following the heating zone to define a pressure zone.

At the inlet side of the pair of pressure rollers 42, the uncoated side of the net structure is combined with a web 43 of material delivered in the direction indicated by the arrow P. This web 43 is caused to bond to the carrier web 37 through the net structure which is still in a thermoplastic condition, in the pressure zone formed by the rollers 42, to form a composite body or non-woven fabric 44 which is drawn off in the direction of the arrow R. The drum 40 has an opening 40a in one face for the supply of hot steam for heating purposes such that the drum 40 also acts as a heating means.

Referring to FIG. 5, the above described methods can be used to directly make a web-shaped body 45 by bonding two webs of material 46, 47 through a net structure 48 of thermoplastic material placed between the webs 46, 47 and shrunk in the direction of the arrow V by heat sealing in a pressure zone (as in FIG. 7). The net structure 48 shows no significant inward shrinking in the direction indicated by the arrows V at the edges 49, i.e. transverse to the longitudinal direction W in which the net structure 48 was fed through the heating zone over the curved guide path. Accordingly, the net structure 48 extends, directly after bonding of the webs 46 and 47, substantially right up to the edges 50, 51 of the webs 46, 47 which are transverse to the direction of shrinkage V. As the net structure 48 retains uniform thickness Z over its whole width C, i.e. both at the edges 49 and in the remaining regions 52 thereof, the net structure 48 is bonded to the webs 46, 47 on both sides with substantial uniformity over the entire width C.

Referring to FIG. 6, wherein like reference characters indicate like parts as above, a web-shaped composite body or non-woven fabric 53 can also be manufactured without the web 16 of material according to FIGS. 1 to 3 or the web 43 of the FIG. 4. The composite body 53 comprises a net structure 54 of which one face is bonded to a web 55 of material and has the same features as described with reference to the embodiment of FIG. 5. As a consequence of the one-sided adhesion of the net structure 54 to the web 55, the body 53 can be employed with the uncovered side of the net 54, for example for applying or heating on a web of cloth or the like.

What is claimed is:

1. A method of making a non-woven fabric comprising the steps of
 guiding a perforated web of an at least mono-axially oriented heat-shrinkable thermoplastic material through a heating zone along a guide path continuously curved in one direction;
 heating the perforated web in said heating zone to a thermoplastic condition to shrink the thermoplastic material and to form a net structure with opened perforations;
 bringing at least one web of material into contact with the heated net structure, said web of material being substantially stable at the plastifying temperature of the perforated web;

feeding the contacting web of material and net structure to a pressure zone with the net structure in a thermoplastic condition; and heat sealing the net structure to the web of material in said pressure zone while employing the heat of the net structure therefore.

2. A method as set forth in claim 1 wherein the perforated web is heated on a convex side of said curved guide path.

3. A method as set forth in claim 1 wherein the perforated web is heated on a concave side of said curved guide path.

4. A method as set forth in claim 1 wherein said guide path is of constant curvature.

5. A method as set forth in claim 1 wherein the perforated web is guided through said heating zone at a predetermined angle relative to a tangent to a vertex of said curved guide path.

6. A method as set forth in claim 5 wherein the perforated web is guided through said heating zone in a direction towards said tangent.

7. A method as set forth in claim 5 wherein the perforated web is guided through said heating zone in a direction away from the tangent.

8. A method as set forth in claim 5 wherein the perforated web is guided into said heating zone in a direction towards said tangent and out of said heating zone in a direction away from said tangent.

9. A method as set forth in claim 5 wherein the perforated web is guided at an angle of at least 2° with respect to said tangent.

10. A method as set forth in claim 1 wherein the perforated web and the web of material are fed together in continuously curved manner in one direction through said heating zone.

11. A method as set forth in claim 1 wherein a second web of material is contacted with the net structure on a side opposite the one web of material, is fed into said pressure zone with the net structure and one web of material and bonded to the net structure and one web of material in said pressure zone.

12. A method as set forth in claim 11 wherein the second web of material is contacted with the net structure immediately ahead of said pressure zone.

13. A method as set forth in claim 1 wherein the perforated web is guided onto the web of material up and into said pressure zone on said continuously curved guide path.

14. A method as set forth in claim 1 wherein said pressure zone immediately follows said heating zone.

15. A method as set forth in claim 1 wherein the perforated web and web of material are guided through an unheated zone between said heated zone and said pressure zone.

16. A method as set forth in claim 1 wherein the perforated web is guided under tension along said curved guide path.

17. A method as set forth in claim 1 which further comprises the step of guiding the perforated web from a delivery means into said heating zone and wherein said curved guide path diverts from a straight line path extending from said delivery means to said pressure zone.

18. A method as set forth in claim 1 wherein the perforated web is a slit film.

19. A method as set forth in claim 18 wherein the slit film comprises a plastics foil with substantially parallel rows of slits arranged substantially transverse to the direction of shrinkage of the plastics foil corresponding to the direction of stretch.

20. A method as set forth in claim 19 wherein the slits are mutually offset.

21. A method as set forth in claim 19 wherein the slit film is made of a material selected from the group consisting of ethylene vinyl acetate, polypropylene, polyamide, polyurethane, and polyethylene.

22. A method as set forth in claim 1 wherein the web of material is selected from the group consisting of textile material, a plastics foil, and a plastics foam.

* * * * *